United States Patent [19]

Scardovi

[11] Patent Number: 4,752,790

[45] Date of Patent: Jun. 21, 1988

[54] CONTROL CIRCUIT FOR AN INK JET HEAD

[75] Inventor: Alessandro Scardovi, Ivrea, Italy

[73] Assignee: Ing. C. Olivetti & C., S.p.A., Ivrea, Italy

[21] Appl. No.: 880,026

[22] Filed: Jun. 30, 1986

[30] Foreign Application Priority Data

Jul. 1, 1985 [IT] Italy .............................. 67601 A/85

[51] Int. Cl.⁴ ............................................ G01D 15/16

[52] U.S. Cl. ............................................ 346/140 R

[58] Field of Search .................... 346/140 PD, 140 R; 400/126; 310/317

[56] References Cited

U.S. PATENT DOCUMENTS 4,393,384 7/1983 Kyser .......................... 346/140 PD 4,535,346 8/1985 Lichti .............................. 346/140 R

*Primary Examiner*—E. A. Goldberg

*Assistant Examiner*—Mark Reinhart

*Attorney, Agent, or Firm*—Banner, Birch, McKie & Beckett

[57] ABSTRACT

Two consecutive voltage pulses of equal duration ($T_1$, $T_2$) and opposite polarities are applied to the control circuit. The two pulses which are combined together and amplified give rise to a signal of a particular wave form, which is applied to the piezoelectric transducer (104) for the expulsion of a drop of ink, free from disturbances caused by vibration of the meniscus at the time of separation of the drop, and to provide for cancellation of the reflected waves in the conduit.

The transducer (104) forms in the ink conduit (102) a pressure wave of complex form, a first portion thereof contributing to the expulsion of a drop of ink and a second portion which is suitably out-of-phase with respect to the first portion neutralizing the reflection phenomena caused by the first portion. An amplifier transistor (118, 120) is biased by means of a resistive network (114) supplied with a constant reference voltage (Vr) and is connected at its output to an RC filter (122) for modifying the slope of the signal which is amplified by the transistor (118).

11 Claims, 3 Drawing Sheets

CONTROL CIRCUIT FOR AN INK JET HEAD

BACKGROUND OF THE INVENTION

The present invention relates to a control circuit for an ink jet head in which the drops of ink are expelled from a nozzle of a conduit filled with ink, in response to a control signal, said ink forming in said nozzle a meniscus having a natural resonance frequency.

As is known, by exciting the transducer with a voltage pulse, a pressure wave is generated in the conduit, which expels a drop of ink which is repeatedly reflected at the end sections of the conduit and causes oscillation of the meniscus at its resonance frequency. Such oscillations substantially interfere with the subsequent emissions of drops and reduce the frequency of drop emissions.

A method has been proposed for reducing the effects of reflection of the pressure wave and the oscillations of the meniscus, which comprises connecting the print element to the ink container by means of a tube of flexible material. Since the tube is normally some tens of centimeters in length, that means that the arrangement occupies a substantial amount of space, giving rise to bulky print devices of substantial weight, more particularly when the head uses a large number of tubular elements.

Likewise, a control and cancellation circuit for eliminating the reflected waves in a print element has also been proposed, in which the piezoelectric transducer is excited with a voltage wave which is without harmonics. Such a voltage wave, of predetermined duration, excites the transducer to eliminate the reflected waves by superimposition. However, while there is no reflection of the pressure wave in the ink conduit, disturbances may be found in the emission of a drop of ink, caused by parasitic vibration of the ink meniscus in the nozzle at the moment at which the drop becomes detached from the nozzle.

SUMMARY OF THE INVENTION

The object of the present invention is to provide a control circuit for an ink jet print head in which expulsion of the drops of ink is free from disturbances caused by vibration of the meniscus upon separation of the drop from the nozzle and under conditions providing for auto-cancellation of reflections of the pressure wave. The invention accordingly provides a control circuit for an ink jet head in which the drops of ink are expelled from a nozzle of a conduit filled with ink, in response to a control signal, said ink forming in said nozzle a meniscus having a natural resonance frequency, the control circuit being so dimensioned as to generate a control signal to neutralise said resonance, whereby expulsion of the drop leaves the meniscus in a rest condition.

These and other features of the invention will be more clearly apparent from the following description of an embodiment, which is given by way of a non-limiting example with reference to the accompanying drawings.

DETAILED DESCRIPTION OF THE PREFERRED EMBODIMENT

Figure 1:
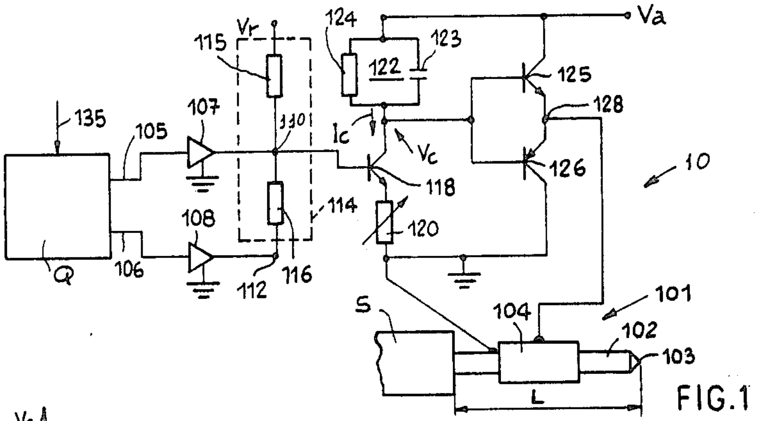
FIG. 1 is an electrical diagram of the control circuit according to the invention, FIGS. *2a*, *2b*, *2c*, *2d*, *2e*, and *2f* show the wave forms produced by the circuit shown in FIG. 1, FIGS. *3a* and *3b* are diagrams showing the deviation of the real position of the drops, FIGS. *4a*, *4b*, *4c*, *4d*, *4e*, and *4f* are diagrammatic representation of the meniscus; and FIGS. *5a*, *5b*, *6*, *7a*, *7b*, *7c*, *7d*, and *7e* show diagrams relating to operation of the print head.

In FIG. 1, the control circuit 10 is connected for example to an ink jet print head 101 comprising a tube 102 provided at one end with a nozzle 103 and connected at the other end to a container S for the ink. As is known, the drops of ink are emitted by way of the nozzle 103 as a result of compression applied to the tube 102 by a sleeve-type piezoelectric transducer 104.

Such compression generates a pressure wave in the tube 102, the pressure wave on the one hand causing emission of the drop and on the other hand giving rise to reflections at the points of discontinuity of the conduit. Such emission further causes an oscillation of the meniscus at its natural resonance frequency. That disturbance includes a component with diametrical nodes and another component with circular nodes. That can be very serious since it causes the front outside surface of the nozzle to be wetted, with consequential displacement of the subsequent drops emitted and variations in the relative speed thereof.

The control circuit comprises a logic signal generator Q having two outputs 105 and 106 connected by means of two level translators 107 and 108 to an electrical system which comprises means for regulating the control signal such as to neutralise resonance of the meniscus. In particular the level translators 107 and 108 are respectively connected to an intermediate node 110 and to an end 112 of a biasing circuit 114. The biasing circuit 114 which is formed by two resistors 115 and 116 in series is supplied with a reference voltage Vr. The node 110 is connected to the base of a transistor 118 which is used as a voltage amplifier. The emitter of the transistor 118 is connected to earth by way of a variable resistor 120 while its collector is connected to a dc feed voltage Va by way of a passive system 122 formed by a capacitor 123 in parallel with a resistor 124. The system 122 performs a filter function for suitably modifying the signal which is amplified by the transistor 118, as will be described hereinafter. The collector of the transistor 18 is also connected to the bases of a pair of transistors 125 and 126 which are connected between the feed Va and earth, in push-pull configuration. The output 128 of the pair of transistors 125 and 126 is directly connected to the piezoelectric transducer 104.

Figure 2:
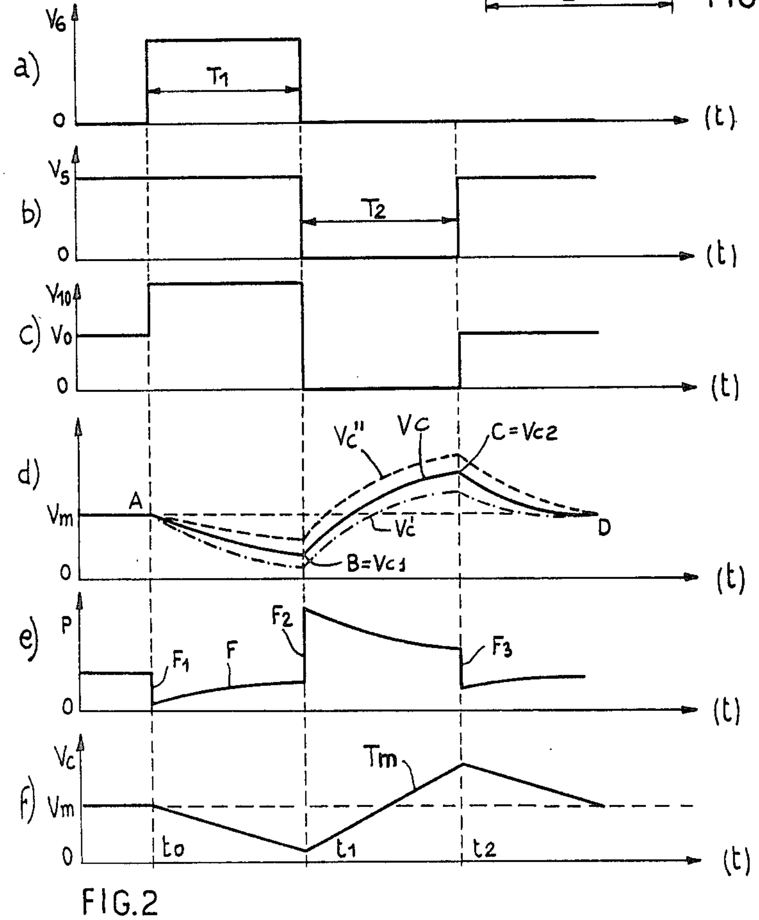

The principle on which operation of the control circuit is based consists of injecting into the tube 102 (see FIG. 1) a secondary pressure wave which is suitably out-of-phase with respect to the main wave and of a sign such as to be superimposed on and cancel the reflected wave of the main wave. The phase shift of the secondary wave with respect to the main wave must be an even multiple of the characteristic time $t_c$ of the tube 102. It is normally preferred for that multiple to be selected as 2. The time $t_c$ is linked to the dimensions of the tube 102 and to the nature of the ink used, in accordance with the expression: $t_c=2\ L/C$ in which L denotes the length of the tube 102 as indicated in FIG. 1 and C is the speed of sound in the ink. The circuit shown in FIG. 1 operates in the following manner. Normally, the generator Q maintains the output 105 at logic level '1' (FIG. 2(*b*)) and the output 106 at logic level '0' (FIG. 2*a*). Since the translators 107 and 108 connect their outputs to earth when their inputs are at level '0', the end 112 of the biasing circuit 114 is normally connected to earth; there is therefore present at the node 110 a dc voltage Vo for biasing of the transistor 118, resulting from the division effect of the resistors 115 and 116. The transistor 118 amplifies the voltage Vo to a continuous value Vm (FIG. 2(*d*)) which is determined by the value selected for the variable resistor 120. The voltage Vm is transferred without appreciable change from the transistors 125, 126 to the transducer 104 which is therefore maintained in a precompression or rest state. At the time $t_o$, the generator Q, in response to a print signal supplied on a line 135, sends the output 106 to logic level '1' for a time $T_1=t_1-t_o$ (FIG. 2*a*). Subsequently, at the time $t_1$, it sends the output 105 to the level '0' for a time $T_2=t_2-t_1=T_1$ (FIG. 2*b*); thus, at the time $t_2$, the generator restores the initial conditions. As has been indicated hereinbefore, the periods of time $T_1$ and $T_2$ must be equal to 4 L/C, in order to achieve the effective cancellation of the reflected waves. Therefore, at the node 110 or at the base of the transistor 118, the voltage V10 assumes the form of a symmetrical square wave, with steep edges and with respect to the voltage V0, as indicated in FIG. 2*c*. The transistor 118 amplifies the voltage V10 to a value Vc which is proportional to the resistor 120. The amplified voltage Vc, also referred to as the control signal, assumes the configuration shown in FIG. 2*d* which the half waves or portions A-B, B-C, C-D are of an exponential configuration, with a time constant Y equal to the product of the values of the resistor 124 and the capacitor 123. In particular the control circuit has a first negative peak B=Vc 1 and a second positive peak C=Vc 2. The values $V_{c1}$ and $V_{c2}$ of the peaks are measured with respect to the mean positive value $V_m$. The system 122 behaves like an RC filter. As is known, a wave of exponential type has a harmonic content which is relatively limited towards the high frequencies, whereby the higher harmonics of the frequency spectrum of the signal V10 and consequently the corresponding resonance harmonics of the system are eliminated.

The voltage Vc is then applied to the transducer 104 by means of the transistors 125 and 126 and thus a pressure wave F of complex form, which is represented on an arbitrary scale in FIG. 2*e*, is generated in the conduit 102. The first edge F1 of the pressure wave F generates decompression in the conduit 102 in order to draw in a small amount of ink from the container S. After the time $T_1$, a second positive edge F2 of the wave F provides the ink with the energy both for expelling a drop ink from the nozzle 103 (see FIG. 1) and for nullifying reflection against the ends of the conduit 102 of the first edge F1. Then, after the time $T_2$, a third negative edge F3 completely cancels reflection of the second edge F2. For those reasons the control signal Vc (see FIG. 2*d*) is referred to as 'auto-cancelling'.

After the phases described hereinbefore, the ink is in a state of rest in the conduit 102 and another signal Vc may be applied to the transducer 104 for expulsion of a further drop of ink.

Variations of the capacitance of the capacitor 123 with which the time constant of the exponential ramp portions of the signal Vc (see FIG. 2*d*) is determined makes it possible to modify the form of the voltage Vc. That variation influences the peak-peak value of the signal Vc but does not alter the ratio between positive and negative peaks and thus makes it possible to control the behaviour of the drops of ink in the phase of separation thereof from the nozzle and the formation of satellites in dependence on the physical characteristics of the ink, in particular the viscosity thereof.

With fluid inks, with a viscosity of the order of 1–6 cstokes, correct separation of the drops and reduced formation of satellites is achieved by adopting a time constant which is equal to about 30 μsec. With denser inks, with a viscosity of the order of 8–16 cstokes, it is possible to use values of $\tau$ which are lower than those indicated hereinbefore, at the limit case being zero, the latter being attained by removing the capacitor 123 from the system 122.

The resistor 120 controls the amplitude of the signal which is amplified by the transistor 118 and consequently control the speed of ejection of the drops. Regulation thereof makes it possible to modify the speed of ejection of the drops in such a way as to adapt the mode of operation of the circuit to the real characteristics of the individual ejector tubes for the purposes of achieving perfect alignment of the drops of the ink on the paper.

Figure 3:
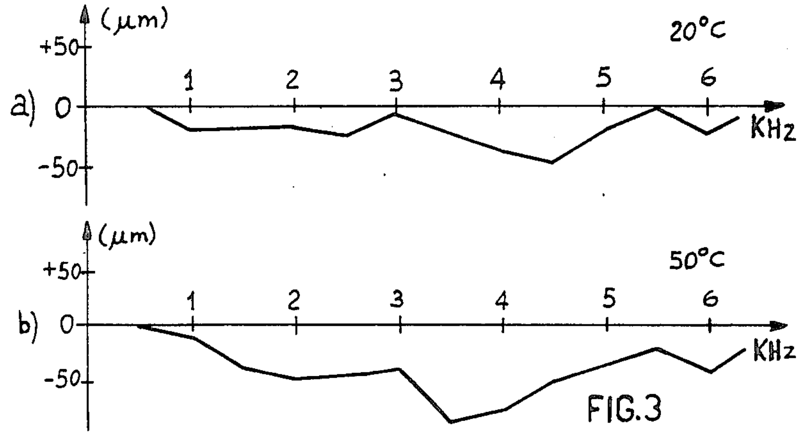

FIG. 3 shows, in dependence on frequency, the curves representing the typical deviation of the real position of the drop of ink with respect to the theoretical position that the drops should assume in flight after a constant delay from the start of the control signal $V_c$. That positional deviation is equivalent to the deviation in speed of the drops. It will be seen from FIG. 3*a*, which was obtained at a temperature of 20° C., that for frequencies of higher than 5 KHz, at the maximum deviation in the position of the drops does not exceed 50 μm at the same frequencies. FIG. 3*b* shows the deviation obtained at the various frequencies, when operating at 50° C.

Figure 5A:
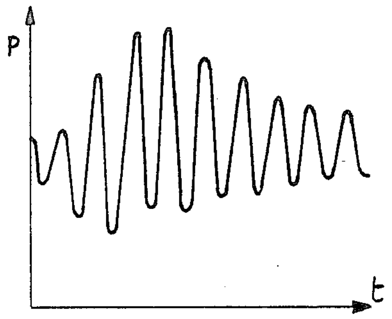
Figure 5B:
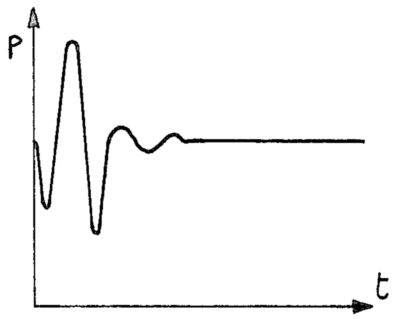

FIG. 5 shows the oscillographic recordings of the pressure P internally of the conduit 102 (see FIG. 1) in response to an excitation wave or control signal Vc (see FIG. 2*d*) of exponential type. In FIG. 5*a*, the pressure wave is produced for a duration $T_1$ and $T_2$ of the control signal shown in FIG. 2*a* such as to produce resonance conditions. It will be seen from the FIG. 5*a* that the pressure P continues to oscillate with a long damping period. That involves emission of secondary drops of ink following the main drop, which easily wet the outside front surface of the nozzle. In FIG. 5*b* the duration $T_1$ and $T_2$ is regulated by means of the generator Q (see FIG. 1) to produce auto-cancellation conditions, and it will be seen that the pressure wave P is rapidly damped after the emission wave, rapidly returning to the state of rest within the element 102 (see FIG. 1). Under favourable conditions of that kind, without resonance, a single drop of ink is expelled, the speed of expulsion thereof remaining substantially constant up to high values in respect of the rate of repetition.

Figure 6:
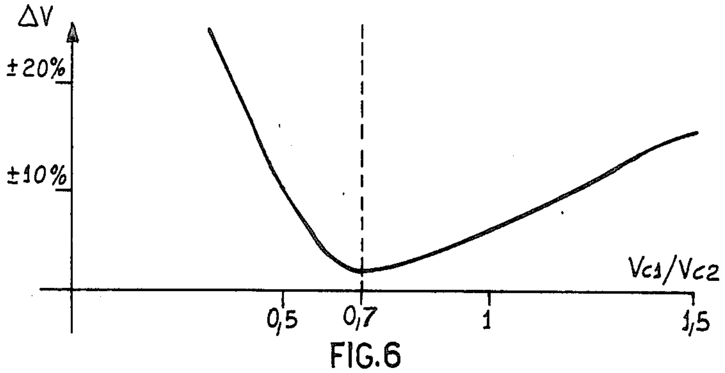
Figure 7A:
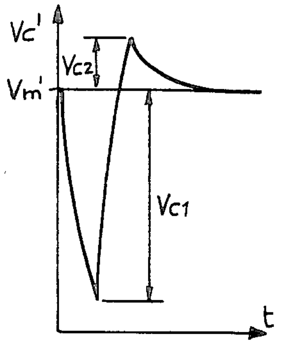
Figure 7C:
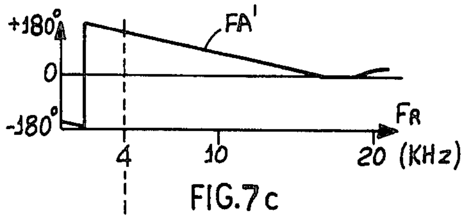
Figure 7D:
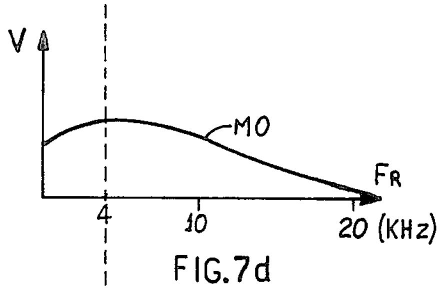
Figure 7B:
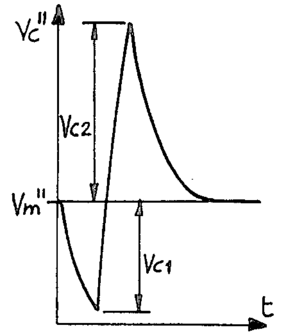
Figure 7E:
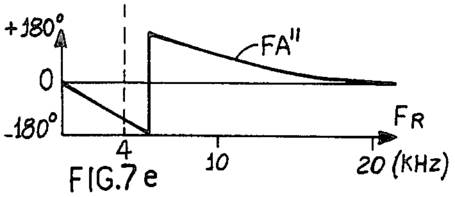

Since the resistors 115 and 116 control the bias voltage of the transistor 118, they determine the value of the ratio between positive peak and negative peak with respect to the voltage $V_m$ of the wave shown in FIG. 2*d*, that is to say they control the condition of symmetry with respect to the voltage Vm of the signal Vc which is amplified by the transistor 118. The variation in such relationship setting and influence other settings and makes it possible to regulate the slope of the final part C-D (FIG. 2*d*) of the control signal to reduce oscillations of the meniscus, which have an adverse effect both on the process of expelling the drops of ink and on the maximum rate of repetition which can be achieved. The value of the ratio Vc1/Vc2 may be varied by regulating the value of the resistors 115 and 116. FIG. *2d* shows in dash-dotted line and in dotted line a first form $V_c'$ obtained with a ratio between the peaks Vc1/Vc2 of 2.5 and of second form $V''_c$ with a ratio of Vc1/Vc2 of 0.43. FIG. 6 shows the percentage variations in the speed of expulsion of a drop dependence on the ratio Vc1/Vc2 of the values of the peaks of the control signal. It will be clearly seen from FIG. 6 that such variation reaches a minimum which, with the system being considered herein, occurs at around Vc1/Vc2=0.7.

As already emphasised, the variation as between positive peak and negative peak of the control signal with respect to the mean value thereof depends exclusively on the ratio between the resistors 115 and 116. That does not influence other settings but makes it possible to regulate the slope of the final part C-D (see FIG. *2d*) of the control signal to reduce oscillations of the meniscus. The regulation effect provides that the phase of compression which is produced in the conduit remains unaltered while the distribution of depression varies between the initial phase and the final phase of ejection. Intrinsic excitation of the meniscus is caused by separation of the drop; in particular separation of the drop occurs after a substantially constant time from the beginning of the control pulse and independently of the relationship between the values of the two peaks and the phase of the harmonic content of the control signal. Therefore the phase oscillation in a condition of resonance of the meniscus is constant for any phase of the harmonic content of the control signal.

Consequently, if the harmonic content of the control signal at the resonance frequency of the meniscus is opposite in phase to the oscillation of the mensicus which is caused by separation of a drop, the two excitations (that produced by the control signal and that produced by the drop detachment) cancel each other out. Therefore the result which is attained is a drop which separates off and leaves the meniscus non-excited and at rest.

FIG. 7 shows the spectra in modulus and phase of the control signal in two different regulation conditions.

In particular, FIGS. *7a* and *7b* respectively show the control signals Vc' and Vc", in respect to two different voltages $V'_m$ and $V''_m$ in order clearly to show the different relationship between the peaks Vc1 and Vc2. FIG. *7d* indicates the modulus MO of the control signal, that is to say the amplitude resulting from the harmonic content of the signal at the various frequencies. The value of the modulus MO which for the circuit being considered has a maximum at around 4000 Hz remains constant upon variations in the relationship between the peaks Vc1/Vc2 at the resonance frequency of the meniscus.

FIG. *7c* and *7e* respectively indicate the curves FA' and FA" which indicate the phase of the harmonic content of the signals Vc' and Vc". It will be seen therefrom that, at the frequency of 4000 Hz, the phase of Vc' is around +180° while the phase of Vc" is around −180°, from which it will be clear that by varying the relationships peaks Vc1/Vc2, it is possible to obtain variations in phase of between +180° and −180°. By suitably selecting the value of the ratio Vc1/Vc2, it is possible to obtain a value in respect of the phase of the control signal, which is opposite to that of the oscillation of the meniscus. That regulation may be dealt with in the design phase of the system, by observing the variations therein on an oscilloscope.

Figure 4:
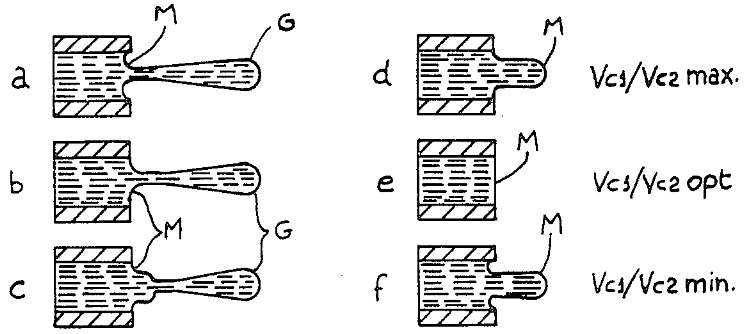

It will be clear from the foregoing that control of the oscillations of the meniscus is important in order to achieve satisfactory suppression of the reflection phenomena, since they cause substantial variations in the speed of expulsion of the drops and serious irregularities in operation of the nozzle. The effect of regulating the ratio Vc1/Vc2 on excitation of the meniscus M, is illustrated in FIG. 4 for three values of the ratio Vc1/Vc2 between the peaks of the pilot control signal. In particular FIGS. *4a–c* indicate the state of the meniscus M at the time of separation of the drop D while FIGS. *4g–f* indicate the state of the meniscus M after separation of the drop.

In FIG. *4a*, the ratio Vc1/Vc2 is regulated to the maximum value. The meniscus M is inflected inwardly at the moment of detachment of the drop D while (see FIG. *4d*) the meniscus oscillates considerably with the possibility of detachment of satellite drops after separation of the drop. In FIG. *4b*, the ratio Vc1/Vc2 is regulated to the optimum value. At the moment of detachment, the meniscus M is of virtually flat shape and is not subject to oscillations after separation of the drop (FIG. *4e*). In FIG. *4c*, with Vc1/Vc2 regulated to the minimum value, the meniscus is bent outwardly at the moment of detachment and even after separation (FIG. *4f*) oscillates considerably, causing problems which are substantially equal to those involved in case a. Regulation of the ratio Vc1/Vc2 does not interact with that of the resistor 120 and the circuit 122 so that such adjustments may be made independently and in any order. Due to production requirements, the values of the resistors 115, 116 and 124 and the capacitor 123 are fixed in the design phase for all the circuits while the variable resistor 120 is regulated in the approval phase on each circuit.

In accordance with another embodiment, the passive system 122 may be replaced by an active circuit of one of the known types capable of producing a signal Tm (see FIG. *2f*) of triangular shape, that is to say with portions constant slope, while retaining the condition that the pulses applied to the node 110 (see FIG. 1) are of durations $T_1=T_2=4$ L/C, as referred to hereinbefore. The control circuit shown in FIG. 1 may also be applied to ink jet print heads of different forms from the tubular configuration shown in FIG. 1. For example, it is possible to use heads in which the tube 102 in FIG. 1 is replaced by an ink chamber of parallelepipedic or cylindrical shape, provided with a membrane-type transducer forming one wall of the chamber. With such heads, maximum cancellation of the reflected waves is produced when the distance L between the nozzle and the rear wall of the chamber is greater than around 5 mm. The circuit shown in FIG. 1 has good stability in regard to the speed of ejection of the drops of ink, both with respect to variations in the rate of repetition and with respect to variations in temperature.

It should be noted that the tube 102 in FIG. 1 does not necessarily have to be connected directly to the container S but the connection between the tube 102 and the container S may also be effected by means of a connecting element of elastic material, possibly containing a filter of porous material for retaining bubbles of air or other foreign particles.

I claim:

1. A control circuit for an ink jet head in which the drops of ink are expelled from a nozzle of a conduit filled with ink, in response to a control signal, said ink forming in said nozzle a meniscus (M) having a natural resonance oscillation frequency, said circuit comprising regulating means for controlling the phase of the harmonic content of said control signal, said regulating means being adjustable so as to cause said circuit to generate said control signal ($V_c$) in such a way that said harmonic content is opposite in phase to the oscillation movement of the meniscus (M), whereby the resonance oscillation of the meniscus is prevented and the expulsion of a drop (G) occurs when the meniscus is in a rest condition.

2. A circuit according to claim 1, characterised in that the control signal (Vc) comprises a decreasing half-wave followed by a increasing half-wave, and by comprising means (118, 120) for amplifying said control signal, the regulating means comprising an electrical system (114) connected to the amplifying means for controlling the value of the positive and negative peaks of the half-waves with respect to a mean value (Vm).

3. A circuit according to claim 2, characterised in that the electrical system (114) comprises first and second resistors (115, 116) in series, the amplifying means (118, 120) being connected to an intermediate point (110) between the resistors whereby the ratio of the values of the resistors determines the relationship between the peaks of the half-waves.

4. A circuit according to claim 3, characterised in that the peak-to-peak value of the control signal (Vc) is determined by said amplifying means independently of the regulating means.

5. A circuit according to claim 2 or 3, characterised in that the amplifying means (118, 120) comprises an electrical filter (122) connected in series between a dc feed voltage source (Va) and the collector of the first transistor (118) for suppressing the higher harmonics of the control signal (Vc).

6. A control circuit according to claim 5, characterised in that the electrical filter (122) comprises a resistor (124) connected in parallel with a capacitor (123).

7. A control circuit according to claim 5, characterised in that the filter (122) comprises an active electrical circuit for generating portions of constant slope in the control signal (Vc).

8. A circuit according to claim 2, comprising a generator (Q) for generating control pulses for the circuit (10) and in which the regulating means vary the form of the half-waves in such a way as to cancel acoustic reflections in the conduit (102), said reflections having a characteristic time of reflection in said conduit characterised in that the generator (Q) generates two consecutive and symmetrical control pulses for enabling the amplifying means (118, 120) to generate the control signal (Vc), such as to form in the conduit (102) a pressure wave formed by a first and a second portions delayed therebetween by said characteristic time for cancelling any reflection of said first portion, whereby emission of the drops (D) of ink from the nozzle (103) is free from disturbances produced by oscillations in the pressure in the conduit.

9. A circuit according to claim 2, characterised in that the electrical system (114) is fed by a reference voltage source, (Vr), said amplifying means being biased by a variable fraction of said reference voltage to vary the ratio between said positive and negative peaks.

10. A control circuit for an ink jet head, for controlling the expulsion of an ink droplet from a nozzle of a conduit filled with the ink and having a characteristic acoustical transmission time, said ink forming in the nozzle an ink meniscus, which tends to oscillate at a natural frequency of resonance, said circuit comprising a pulse generator to generate control pulses for the circuit, means for amplifying said pulses and regulating means connected to said amplifying means, wherein said generator generates two consecutive pulses symmetrical with respect to a mean value and each having a duration equal to an even multiple of said characteristic time, said amplifying means being responsive to said pulses to produce a control signal having in respect to a mean voltage a negative peak followed by a positive peak delayed therefrom by characteristic said time, the ratio between the positive and negative peaks being so regulated by said regulating means that the phase of the harmonic content of a pressure wave produced in said conduit by the control signal is opposite to the oscillations of the meniscus in said nozzle, whereby on the expulsion of a droplet the meniscus remains in its rest condition and the acoustical reflections of said pressure wave in said conduit are suppressed.

11. A circuit according to claim 10, wherein said pressure wave comprises a first edge to generate in said conduit a depression, a second edge to provide the ink with an energy both for expelling a droplet from said nozzle and for cancelling the acoustical reflections of said first edge in said conduit and a third edge to suppress the acoustical reflections of said second edge in the conduit.

* * * * *